March 10, 1953 W. L. BROWN 2,630,959
APPARATUS FOR SEALING CLOSURE CAPS ON CONTAINERS
Filed Jan. 29, 1948 4 Sheets-Sheet 1
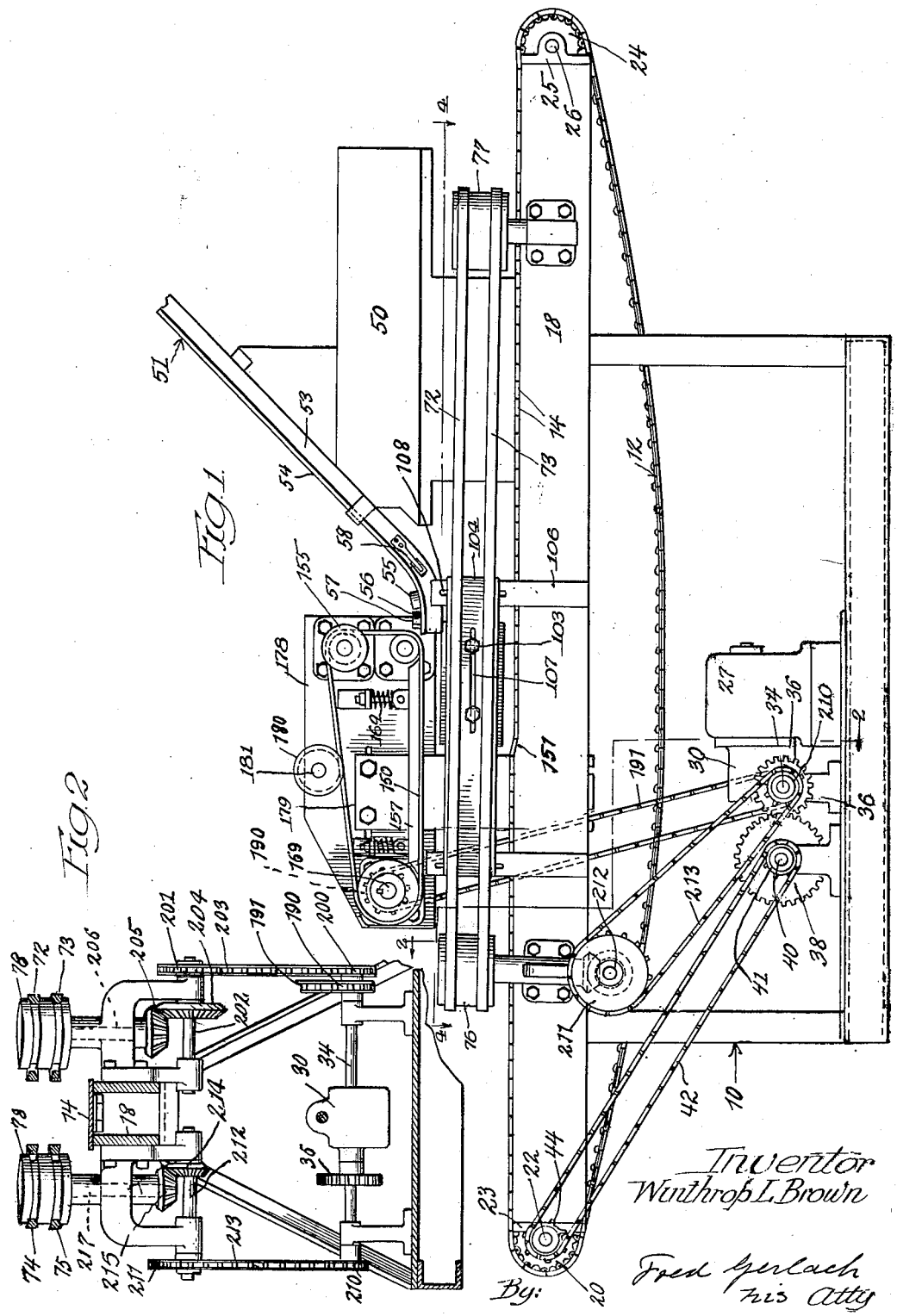
Inventor
Winthrop L. Brown
By: Fred Gerlach
his Atty

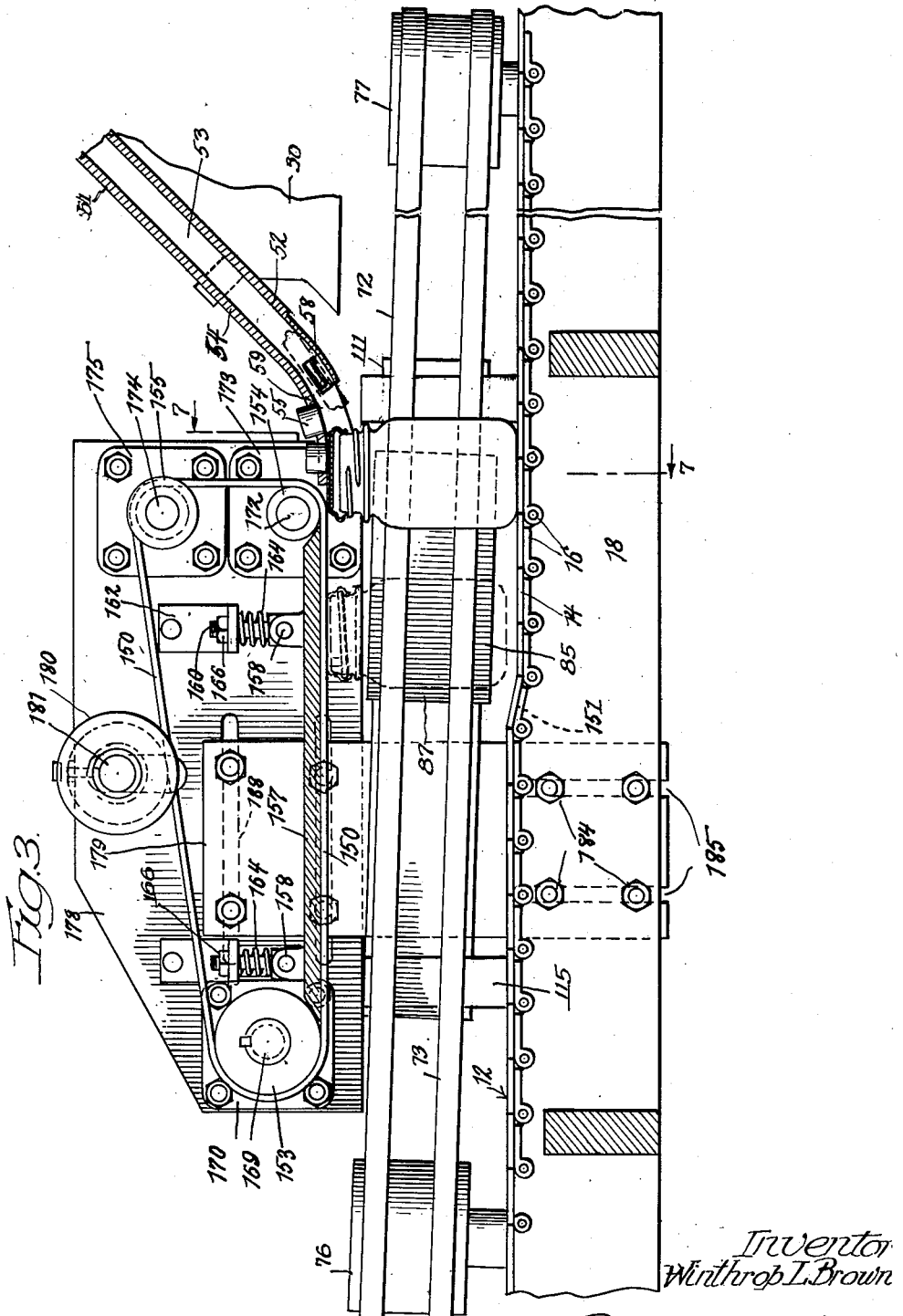

March 10, 1953 W. L. BROWN 2,630,959
APPARATUS FOR SEALING CLOSURE CAPS ON CONTAINERS
Filed Jan. 29, 1948 4 Sheets-Sheet 3
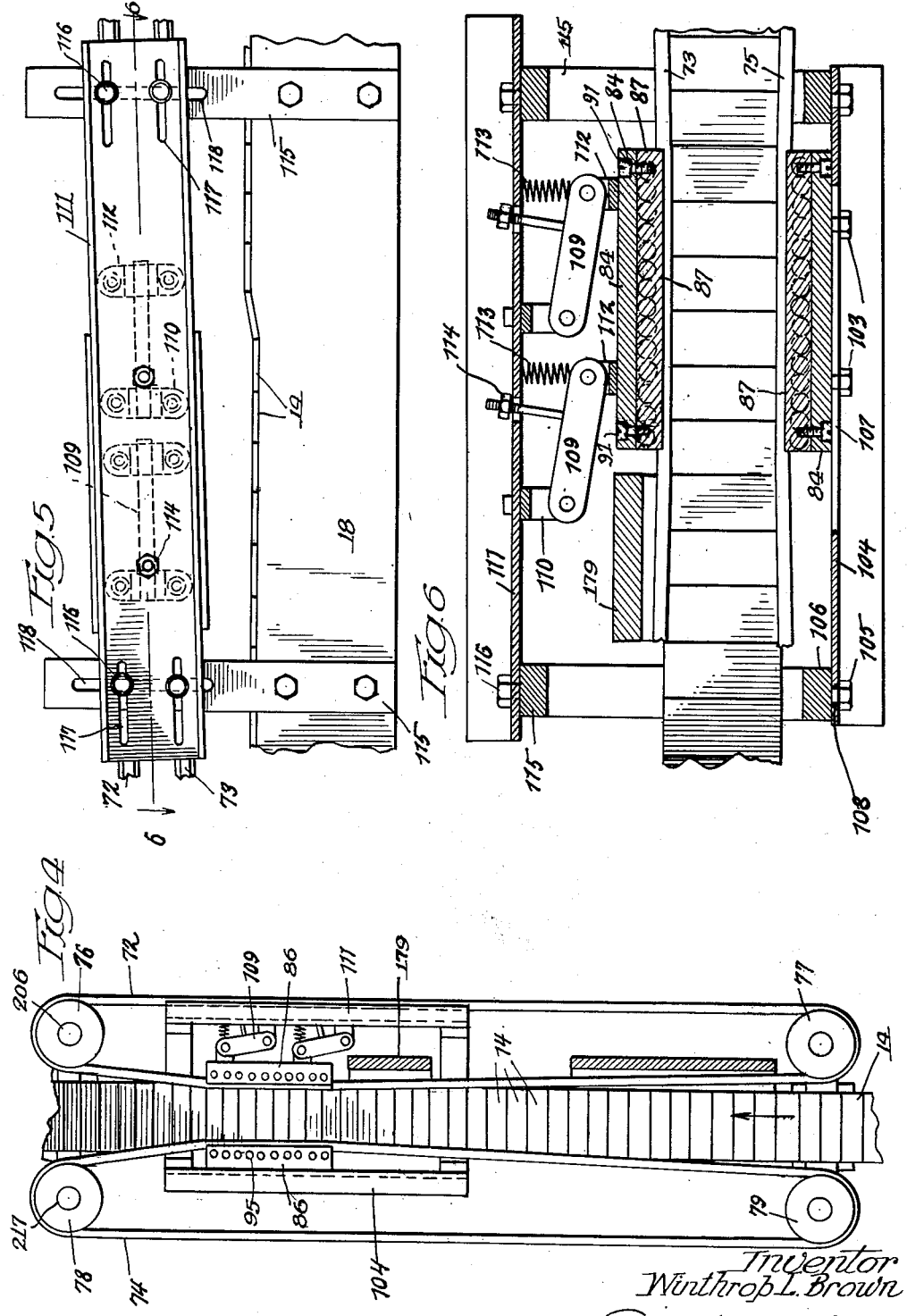
Inventor
Winthrop L. Brown
By: Fred Gerlach
his Atty March 10, 1953  W. L. BROWN  2,630,959
APPARATUS FOR SEALING CLOSURE CAPS ON CONTAINERS
Filed Jan. 29, 1948  4 Sheets-Sheet 4
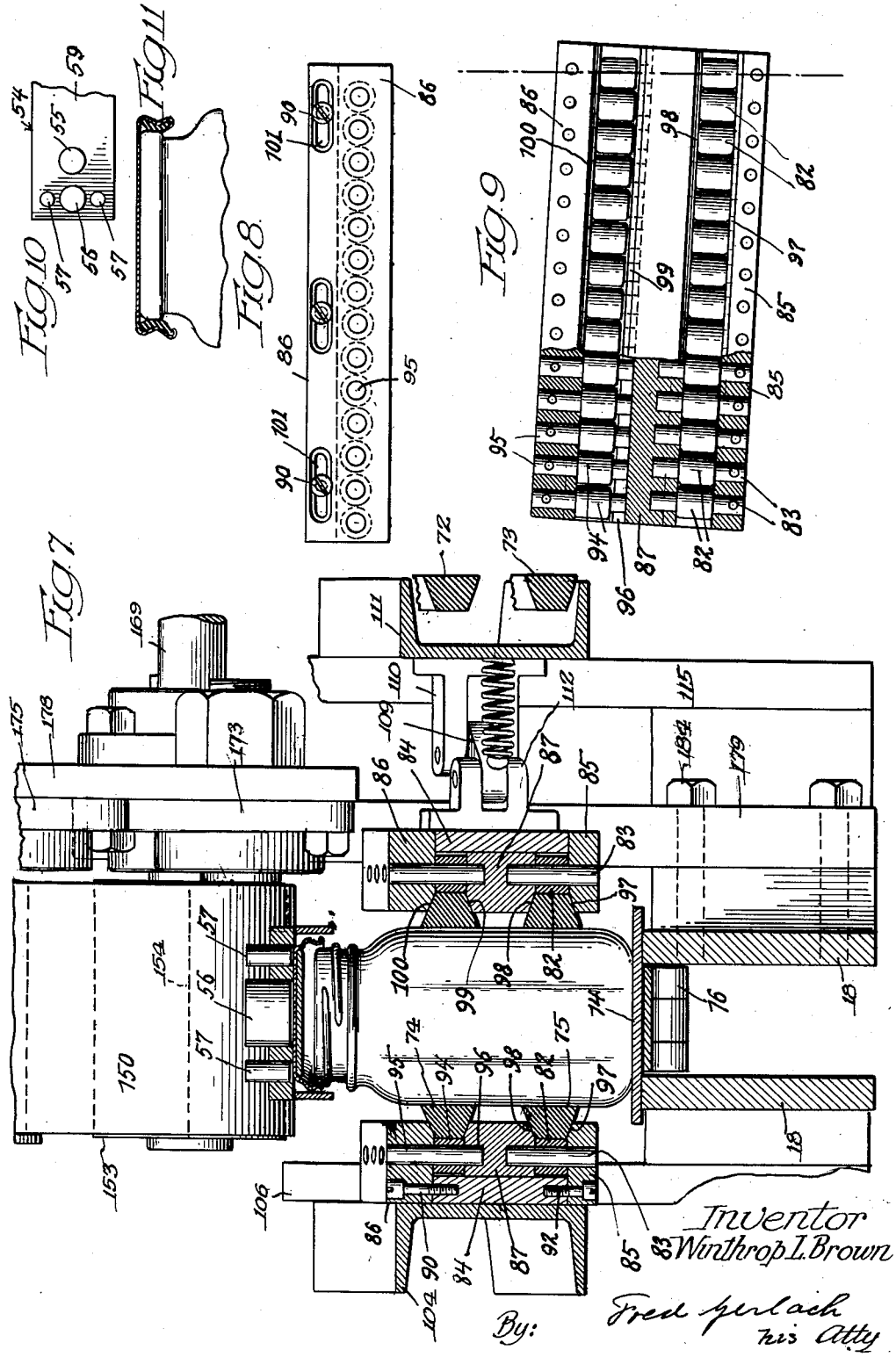

Patented Mar. 10, 1953

2,630,959

UNITED STATES PATENT OFFICE 2,630,959

APPARATUS FOR SEALING CLOSURE CAPS ON CONTAINERS

Winthrop L. Brown, Newburgh, Ind., assignor to Bernardin Bottle Cap Co., Inc., Evansville, Ind., a corporation of Indiana Application January 29, 1948, Serial No. 5,148

15 Claims. (Cl. 226—88)

The invention relates to sealing closure caps on containers, such as glass jars and the like.

One object of the invention is to provide an improved method of sealing closure caps on filled containers whereby the containers will be helically lifted during their forward movements to effect the sealing of the caps on the containers.

Another object of the invention is to provide improved apparatus for sealing closure caps on filled containers, in which the containers are continuously moved in progression and the cap truly sealed on the containers.

Another object of the invention is to provide improved apparatus for sealing screw-caps on containers in such a manner as to prevent cross-threading of the screw threads on the caps and the containers.

Another object of the invention is to provide simple and efficient means for rotating and lifting progressively moving containers relatively to the closure caps during the sealing of the caps on the containers.

Another object of the invention is to provide improved apparatus by which the sealing of the caps on the containers is effected by endless belts engaging the sides of the containers.

Another object of the invention is to provide an improved method for sealing caps on filled containers which have been submitted to an atmosphere of steam to produce a sub-atmospheric pressure in the sealed containers.

Other objects of the invention will appear in the detail description.

The invention consists in the several novel features hereinafter set forth and more particularly defined by the claims at the conclusion hereof.

In the drawings:

Fig. 1 is a side elevation of a machine exemplifying the invention;

Fig. 2 is a transverse section taken on line 2—2 of Fig. 1;

Fig. 3 is a central vertical longitudinal section of that portion of the machine which includes the device for delivering caps to the moving jars, and the means for sealing the caps on the jars; parts being shown in elevation;

Fig. 4 is a horizontal section taken on line 4—4 of Fig. 1;

Fig. 5 is a side elevation of one of the devices for exerting pressure on the side-belts and its support;

Fig. 6 is a section taken on line 6—6 of Fig. 5;

Fig. 7 is a transverse section taken on line 7—7 of Fig. 3;

Fig. 8 is a plan of one of the frames in which the rollers for exerting pressure on the side-belts is supported;

Fig. 9 is a face view partly in section and partly in elevation of one of the pressure devices for the side-belts.

Fig. 10 is a plan view of the lower end of the runway of the cap delivery device; and Fig. 11 illustrates a cap with a side seal for a jar and the relative position of the jar at the time rotation of the jar is commenced in sealing the cap on the jar.

The invention is exemplified in a machine which comprises a frame generally designated 10 for supporting the several parts of the apparatus in co-acting relation. The filled containers are placed in progression on a continuously operated, endless conveyor 12, and during travel of the containers, the caps are sealed on the containers and retained thereon until a vacuum has been created in the sealed containers. Conveyor 12 includes slats 14 which are serially connected by sprocket links 16. The slats 14 in the upper reach of conveyor 12 are horizontally supported on beams 18 which are spaced apart, and function as a track. Conveyor 12 passes around a driven sprocket 20 which is located at the end of the apparatus at which the sealed containers are delivered and fixed on a shaft 22, which is journalled in bearings 23 which are fixed on one end of beams 18. The loading end of the conveyor 12 passes around an idler sprocket 24 on a shaft 26 which is journalled in bearings 25 which are fixed to the other end of beams 18. This exemplifies an endless, continuously driven conveyor for progressively moving the filled containers through the apparatus during the sealing operation.

Mechanism for driving the conveyor 12 and the driven devices of the apparatus includes an electric motor 27 mounted in frame 10, speed reduction gearing 30 driven by said motor, a cross-shaft 34 driven by gearing 30, a gear 36 fixed to cross-shaft 34, a gear 38 meshing with gear 36 and on a cross-shaft 40, a sprocket wheel 41 fixed on shaft 40, a sprocket chain 42 driven by wheel 41, and a sprocket wheel 44 fixed to shaft 22 of the drive sprocket 20.

The filled jars are progressively placed on the loading station at the right-hand end of conveyor 12 and initially pass under a chest 50, which is provided with suitable means for delivering steam into the head spaces of the filled jars before the caps are associated with the jars, for evacuating air from the head spaces and subsequently producing a subatmospheric pressure in the sealed jars. This chest 50 may be of any suitable construction, as well understood in the art, for creating an atmosphere of steam in and around the upper ends of the jars.

Upon leaving chest 50, the jars, as they are carried forwardly by conveyor 12, engage the caps to be sealed thereon. Upon engagement of the caps by the jars, the caps are initially supported above, and independently of, the jars preparatory to the sealing of the caps on the jars.

A device for delivering caps for engagement by the jars is exemplified by an inclined runway 51 which successively delivers the caps by gravity into a slightly inclined position to present the leading portion lower rim of the skirt on the cap into the path of the upper end of the jar for movement of the cap with the jar traveling forwardly on conveyor 12. Runway 51 includes a bottom 52, sides 53, and a top bar 54 suitably secured together. The lower end of the runway is curved and provided with a pair of light resilient strips 58 for arresting the lowermost cap in position for engagement by the jar.

The lower end of runway 51 terminates adjacent the steam chest to present caps for engagement by the jars, respectively, while the steam atmosphere is maintained in the head spaces of the jars.

The invention provides for lifting and rotating the jars during each sealing operation while the caps are held against rotation.

Screw caps, as illustrated in Fig. 7, are usually provided with sealing means under their tops, and, in the sealing operation, it is important to prevent cross-threading which results in an imperfect seal.

In sealing caps with side-seals, as exemplified in Fig. 11, it has been found that, when the cap is cocked on the jar during the sealing operation, the sealing compound is non-uniformly distributed around the jar, which results in mutilating the seal and an inefficient seal. In sealing caps with side-seals on jars, it has also been found that simultaneous rotation and lifting or helical movement to the jars in sealing operation facilitates the sealing of the cap and the side-seal, prevents cocking, and results in a uniform distribution of the sealing compound around the sides of the jars and the caps.

Permanent magnets are utilized for supporting the caps during their initial forward movement from the lower end of the runway, and for holding them against rotation by the jars during the initial rotation and lifting or helical movement of the jars after the cap has assumed a truly horizontal position over a jar.

A permanent magnet 55 extends through the curved lower portion 59 of the top bar 54 of runway 51, and supports the cap during its initial forward movement by the jar. A permanent magnet 56 extends through the horizontal terminal of the top bar 54 of the runway, and continues to support the caps until they have assumed a truly horizontal position over the jar. Auxiliary permanent magnets 57 extend through bar 54 at the sides of magnet 56 for aiding the latter in supporting the caps and holding them in horizontal position until rotation of the jars has been initiated. Bar 56 is formed of conductive metal, for example, aluminum, for confining the magnetic field to the caps. This exemplifies means for supporting the caps in truly horizontal position over the jars until the caps and jars are co-axial and the sealing operation has been initiated with rotation and lifting or helical movement of the jars, as hereinafter described, while the caps are carried forwardly by the jars. The caps in their continued forward movement with the jars pass out of the influence of magnets 56 and 57, and beneath a continuously driven pressure belt 150, hereinafter more fully described, which continues to hold the caps against rotation until the sealing has been completed.

In their progressive forward movement, the jars are simultaneously rotated and lifted or helically shifted until the caps have been sealed thereon. The means for imparting this helical movement to the jars comprises a pair of upper and lower endless V-type belts 72 and 73 for engaging one side of the jars, and a co-acting pair of upper and lower endless V-type belts 74 and 75 for engaging the opposite sides of the jars. These side-belts are formed of suitable elastic material for frictionally gripping the opposite sides of the jars. The side-belts on opposite sides of the jars are differentially driven to effect rotation of the jars on their vertical axes as they are moving forwardly substantially synchronously with the conveyor 12, and are mounted with an upward and forward pitch to impart vertical movement to the jars during their rotation and the sealing operation, while the caps are held against rotation and upward movement by the superimposed pressure of belt 150. These side-belts positively impart helical movement to the jars on their vertical axes while the caps are co-axially superimposed thereon until the caps and jars are in fully sealed relation. A pair of side-belts is used at each side of the jars for maintaining their axes vertical during the forward and rotative movements of the jars. Side-belts 72 and 73 pass around, and are driven by, a grooved pulley 76, and extend around a grooved idler pulley 77. Side-belts 74 and 75 are driven by a grooved pulley 78 and pass around a grooved idler pulley 79. These pulleys are mounted to cause the V-belts to travel in planes which are upwardly and forwardly inclined for imparting vertical lifting movement to the jars during the sealing operation. The side-belts on opposite sides of the jars are driven differentially for rotating jars during the sealing operation and continuously advancing them. The differential travel of the side-belts on opposite sides of the jars is varied according to the diameter of the jars and the travel of the conveyor 12. For example, assuming the jars have a circumference of 9.522 inches and the conveyor 12 is driven to travel 25 feet per minute, and it is desired to move the jars forwardly at the same rate of speed, the belts 72 and 73 will be driven at the rate of 14.522 inches per second with their inner reaches moving forwardly or in the direction of the movement of conveyor 12, and belts 74 and 75 will be driven so their inner reaches will travel in the opposite direction at the rate of 4.522 inches per second. This relative travel of the side-belts will impart sufficient rotation to the jars to screw them into the caps while they are traveling a predetermined distance following the point at which the rotation of the jars is initiated. During this rotation of the jars, the upward pitch of the side-belts imparts an upper axial movement to the jars conformably to the pitch of the screw threads on the caps and the jars, so that during a predetermined portion of the continuous forward travel of the jars they will be rotated and lifted or helically moved to screw the jars into sealing engagement with the caps.

The inner reaches of the side-belts are deflected and pressed inwardly for frictionally gripping the jars while they are traversing the zone in which the sealing is effected and are also positively guided vertically for effecting lifting the jars. Each pair of side-belts is deflected and guided by a device which includes series of pressure-rollers engaging the inner faces of the belts and tracks for slidably guiding the side faces of the belts. One of these devices is fixedly mounted to co-act with the inner reaches of one pair of side-belts and the other is movably supported and spring-loaded for pressing the inner reaches of the opposite side-belts against and gripping the jars. Each of said devices comprises a support or frame which includes a side plate 84, a lower bar 85, an upper bar 86, and a central bar 87. Bar 85 is fixedly secured by screws 92 to side plate 84; bar 87 is secured by screws 91 to plate 84; and top bar 86 is secured by screws 99 to side plate 84. The inner face of each lower side-belt bears against a series of parallel rollers 82 which have cylindrical peripheries, and are journalled on studs 83, which are fixedly held in bottom bar 85 and central bar 87. The inner face of each upper side-belt is engaged by a series of rollers 94, which have cylindrical peripheries and are journalled on studs 95 which are fixedly secured in upper bar 86 and extend into a channel 96 in central bar 87. The lower inclined side face of each lower belt slides on a guide or thrust surface 97 formed on lower bar 85, and the top face of the lower belt and the under face of each upper belt are slidably guided by inclined thrust surfaces 98 and 99 on central bar 87. The upper inclined side face of each upper side-belt is guided by a thrust surface 100 formed on bar 86. Each row of rollers 82 and 94 is arranged in an inclined plane conformably to the pitch of the side-belts, so that said belts will be guided by said rollers and their contiguous inclined thrust surfaces in a plane corresponding to the lifting movement of the jars desired during the sealing operation, and the axes of said rollers are perpendicular to said planes. The rollers in the upper and lower rows are relatively positioned vertically so that their centers of pressure on the upper and lower side-belts will be disposed in a true vertical plane, so that the axes of the jars will be maintained vertical during the lifting movement of the jars and not tilted during the sealing operation. In order to maintain this vertical relationship of the centers of pressure at the upper and lower series of rollers against the belts when the pitch of the side-belts is varied, screws 99 which secure bar 86 to the side plate 84 extend through slots 101 in bar 86, and the lower ends of stud shafts 95 extend into channel 96. By longitudinal adjustment of bar 86, the upper rollers may be thus adjusted to locate the pressure points between the upper and lower belts and the upper rollers 94 and lower rollers 82 in vertical planes, respectively.

The side plates 84 of the pressure device for one pair of side-belts is secured by screws 103 to a channel beam 104, which is secured by screws 105 to a pair of standards 106, which are fixedly supported on one of the beams 18. Screws 103 extend through a longitudinal slot 107 and screws 105 extend through vertical slots 108 to permit the supporting channel beam 104 for said device to be adjusted for pitch variation of said belts to vary the lifting movement of the jars and for engaging the jars at different heights.

The side plate 84 of the guide and pressure device for belts 72 and 73 is movably mounted and spring-loaded for exerting transverse pressure on said belts and causing the jars to be gripped between the belts on their opposite sides. For this purpose said side plate is supported by a pair of parallel links 109 which are pivotally supported by lugs 110 which are secured to a channel beam 111, and are pivoted to lugs 112 which are fixed to the outer face of said side plate 84. Springs 113 urge links 109 inwardly and adjustable stops 114 limit the inward movement of said side plate 84. Channel beam 111 is secured to posts 115 by bolts 116 which extend through slots 117 in beam 111 and through slots 118 in posts 116. These bolt and slot connections provide for vertical and angular adjustment of the pressure device for belts 72 and 73 for pitch and vertical adjustment. These pressure devices cause the jars to be gripped for rotation and lifting movement while the jars pass between the inwardly deflected portions of the side-belts.

Before the caps are moved out of the magnetic field of the magnets 56, 57, they pass under an endless vertical pressure belt 150 which travels forwardly and synchronously with conveyor 12 and the jars. After the caps are released by said magnets, belt 150 frictionally holds the caps against rotation and holds the caps down on the jars while the jars are being rotated and vertically shifted to complete the sealing operation which occurs during the period when the jars are gripped by the side-belts. After each jar is sealed, it is desirable to securely hold the cap pressed on the jar until a vacuum has formed in the jar which will permanently seal the cap on the jar. For this purpose the pressure belt 150 is extended to continue the engaging pressure between the caps and the jars for a predetermined period after the rotation and lifting movement of the jars has ceased.

For causing the caps and jars to be pressed together after the jars have been lifted off the conveyor 12 by the side-belts and sealed, the beams 18 are provided with inclined surfaces 151 which lift the slats 14 of the conveyor 12 sufficiently to cause the caps and jars to be vertically gripped during their continued forward travel, after the jars are released by the side-belts.

Pressure belt 150 extends around, and is driven by, a pulley 153, and also extends around idler rolls or pulleys 154 and 155, all of which are mounted to rotate on parallel horizontal axes. A spring-loaded pressure plate 157 overlies the lower reach of belt 150 which engages the caps. Plate 157 is pivotally connected at 158 to studs 160 which are slidably mounted in lugs 162. Springs 164 between said lugs and said studs urge the pressure plate downwardly within the limits of stop nuts 166. Pulley 153 is fixed to a driven shaft 169 which is journalled in a bearing 170. Pulley 154 is journalled on a shaft 172 which is supported in a bracket 173. Roll 155 is journalled on a shaft 174 which is fixed in a bracket 175. A bearing 170 and brackets 173 and 175 are fixedly secured to a frame plate 176 which is supported by a standard 179 which is fixedly supported from one of the beams 18. A pulley 180 engages the upper reach of belt 150 for keeping it taut, and is journalled on a shaft 181 which is adjustably mounted in plate 176. Standard 179 is secured to beam 18 by screws 184 which extend through slots 185 to permit vertical adjustment of the frame plate 178 and the pressure belt carried thereby. Frame plate 178 is secured to standard 179 by bolts 187 which extend through horizontal slots 188 in frame plate 178 for horizontal adjustment of the pressure belt.

Pressure belt 150 is driven to travel synchronously with conveyor 12 by a sprocket wheel 190 which is fixed to shaft 169 of drive pulley 153, a sprocket chain 191 on the sprocket wheel 190 and a sprocket wheel 192 on the cross-shaft 34. This driving mechanism is designed to drive belt 150 so it will travel at the same speed as conveyor belt 12 is driven.

Between the side pressure devices and the pulleys for the side-belts, the inner reaches of said belts slope outwardly so that there will be gripping relation with the jars only while they are passing between the side pressure devices, and the jars with the caps sealed thereon will be moved forwardly by conveyor 12 and vertical pressure belt 150.

The mechanism for driving side-belts 72 and 73 at one side of the jar to produce in co-action with belts 74, 75 rotation of the jars while they are traveling between the pressure device for said belts, comprises a sprocket wheel 200 fixed to motor-driven shaft 34, a sprocket wheel 201 on a shaft 202, a sprocket chain 203 between sprockets 200 and 201, a beveled gear 204 fixed to shaft 202, a beveled pinion 205 fixed to the lower end of the shaft 206, to the upper end of which is fixed grooved pulley 76 which drives side-belts 72 and 73. This gearing is proportioned to drive belts 72 and 73 at the high speed required for rotating in co-action with belts 74 and 75 the jars while they are passing between the pressure devices for the side-belts and for moving the jars forwardly in the direction in which, and the speed at which, the conveyor 12 travels.

The mechanism for driving side-belts 74 and 75 at the opposite sides of the jar which are driven so that their inner reaches will travel at a low speed and in the opposite direction of the travel of conveyor 12, comprises a sprocket wheel 210 on cross-shaft 34, a sprocket wheel 211 on a shaft 212 and a chain 213 between sprockets 210 and 211, a beveled gear 214 on shaft 212, a beveled gear 215 meshing with gear 214 and fixed to the shaft 217 of grooved pulley 78 which drives side-belts 74 and 75.

This gearing for driving the side-belts for jars having a circumference of 9.522 inches with conveyor 12 and pressure belt 150 is driven to move forwardly at the rate of substantially 25 feet per minute, will have the suitable ratio to impart to side-belts 72 and 73 movement at the rate of about 14.522 inches per second, with their inner reaches moving forwardly in the direction of movement of conveyor 12, and belts 74 and 75 will move so their inner reaches will travel in the opposite direction at the rate of about 4.522 inches per second. This differential travel of the side-belts will cause the jars, as soon as they are gripped between the portions of the side-belts traversing the side pressure devices, to travel forwardly bodily at substantially the same speed as the conveyor 12 and belt 150, and to rotate and lift the jars into engagement during the traverse of the jars between said side pressure devices.

Differential travel of the opposed side-belts is varied for jars of different diameters, in order to cause the jars to rotate sufficiently for completely sealing the caps before the jars pass out of gripping relation with the side-belts. For this variation it is only necessary to change the driving mechanism for different ratios of the side-belts.

In sealing screw caps on jars, it is desirable to rotate the jars by the side-belts sufficiently to screw them into full sealing relation with the caps.

The present invention may be advantageously used in sealing caps with side seals on jars. In this type of seal, these advantages may be attained by a relatively lesser degree of rotation of the jars relatively to the caps than is necessary in sealing screw caps. In consequence, if the machine is to be used solely for sealing side seal caps and jars, the driving mechanism may be designed to produce relatively less rotation of the jar during the sealing operation.

The operation of the apparatus for, and the method of, sealing screw caps on jars is as follows: The filled jars are delivered onto the receiving station of endless conveyor 12 in advance of the steam chest 50 by any suitable means or in any suitable manner, and are carried forwardly in progression by said conveyor. While traveling under chest 50, steam is introduced into the head spaces of the jars and around them for evacuating air and delivering a hot vapor which, after the caps are sealed on the jars, will produce a sub-atmospheric pressure in the jars for permanently holding the caps on the jars. After passing under the steam chest, each jar engages the inner periphery of the leading portion of the depending skirt on the lowermost cap in runway 51. The cap is then advanced by the jar while it is successively held magnetically by a permanent magnet 55 and magnets 56 and 57.

As each cap is moved forwardly by the jar and passes under magnets 56 and 57, the cap will be supported over the jar. The screw cap will be magnetically supported as illustrated in Fig. 3, and the cap will be guided horizontally by the terminal of the runway 51. While the cap is thus magnetically supported, the advancing jar will pass into position to be gripped at the first rollers 92 and 94 and thereupon the jar will commence to rotate on its vertical axis as long as it remains gripped by the side-belts. The side-belts will then continue the forward bodily movement, rotation and lifting of the jars due to the upward pitch of the side-belts. The initial upward helical movement of the jar will cause the screw thread on the jar to mesh with the screw thread on the cap before the cap is released by magnets 56 and 57. This insures the initial engagement of the screw threads without cocking or danger of cross-threading. During the continued helical movement of the jar, the cap is engaged and yieldingly pressed downwardly by belt 150 which travels synchronously and forwardly with the jar. The spring-loaded belt 150 will frictionally hold the cap against rotation during the continued forward and helical movement of the jar. The helical movement necessary to fully seal the cap and jar together is completed before the jar is released by the side-belts which are effective only while they are traversing the side pressure devices.

When the jar passes out of gripping relation with the side-belts at the trailing end of the side pressure devices, its bottom will be vertically spaced from the conveyor 12. It is desirable to retain the cap and jar tightly pressed together vertically until the sub-atmospheric pressure or vacuum in the jar has been created by the cooling of the vapor in the jars. The elevated jar passes onto the elevated portion of conveyor 12 at the incline 155 on beams 18, so that during the continued forward movement of the sealed jar, the cap and jar will be pressed tightly together until they pass beyond pressure belt 150, at which time the vacuum will have formed and the jars will be permanently sealed. Upon reaching the delivery station on conveyor 12, the completely sealed jars will be progressively moved by any suitable means or in any suitable manner.

In the method of, and apparatus for, sealing which are provided with circumferential seals for engaging the sides of the jars, the jars will engage and shift the caps under the permanent magnets 55, 56, and 57, so that the caps will be initially supported over, and independently of, the jars, as before described. The initial, helical movement of the jar, while the cap is held against rotation, with its top horizontal, will cause the jar to uniformly engage the sealing ring in the cap and will facilitate the passage of the jar through the sealing ring to its closed position. In sealing this type of cap on jars, the differential travel of the side-belts may be reduced by the use of gear ratios to produce a lesser degree of rotation on the jar. The pitch of the side-belts lifts the jar into sealed relation with the caps before the jars pass out of gripping relation with the side-belts, so that in their continuing movement the sealed jars will be pressed between conveyor 150 and the elevated conveyor 12.

The invention exemplifies a method of, and apparatus for, sealing jars, in which continuously conveyed jars have imparted thereto helical movement for sealing caps on the jars.

The invention also exemplifies a method of, and apparatus for, sealing screw caps on jars by helical movement of the jars while the caps are held against rotation and the jars are continuously advanced and rotated by endless side-belts.

The invention also exemplifies a method of, and apparatus for, sealing caps on jars progressively in succession and at a high speed, with efficiency.

The invention also exemplifies a method of, and apparatus for, sealing caps on jars, and effectively preventing cocking of the caps or cross-threading when screw caps are used.

The invention is not to be understood as restricted to the details set forth since these may be modified within the scope of the appended claims without departing from the spirit and scope of the invention.

Having thus described the invention, what I claim as new and desire to secure by Letters Patent is:

1. Apparatus for sealing closure caps on filled containers which comprises: a conveyor for moving filled containers in progression; a cap-feeding device for presenting the caps for engagement by the moving containers; means for holding the caps against rotation; side-belts mounted to travel with an upward and forward pitch for helically shifting the containers; means for differentially driving the side-belts to impart rotation and lifting movement to the containers; and means for exerting vertical pressure on the caps and holding said caps against rotation during the rotation of the containers.

2. Apparatus for sealing closure caps on filled containers which comprises: a conveyor for moving filled containers in progression; a feeding device for presenting the caps for engagement by the moving containers; means for holding the caps against rotation; a pair of side-belts at each side of the containers, mounted to travel with an upward and forward pitch; means for differentially driving the side-belts to impart rotation and lifting movement to the containers; and a driven belt for exerting vertical pressure on the caps during the rotation of the containers.

3. Apparatus for sealing closure caps on filled containers which comprises: a conveyor for moving filled containers in progression; a feeding device for presenting the caps for engagement by the moving containers; means for holding the caps against rotation; a pair of side-belts at each side of the containers, mounted to travel with an upward and forward pitch; means for differentially driving the side-belts to impart rotation and lifting movement to the containers; continuous series of rollers for pressing the side-belts against the containers; and means for exerting pressure and holding the caps against rotation during the rotation of the containers.

4. Apparatus for sealing closure caps on filled containers which comprises: means for continuously conveying filled containers in progression; means for presenting caps for engagement by, and movement with, the moving containers; a pair of side-belts at each side of the containers, mounted to travel on an upward pitch; pressure means for the side-belts for gripping the containers; and mechanism for differentially driving the belts at the opposite sides of the containers for helically shifting and bodily advancing the containers; and means for holding the caps against rotation during the helical movement of the containers.

5. Apparatus for sealing closure caps on filled containers which comprises means for continuously conveying filled containers in progression; means for delivering caps for engagement by, and movement with, the moving containers; a pair of endless side-belts for engaging each of the opposite sides of the containers, mounted with an upward and forward pitch, for imparting helical movement to the containers on their own vertical axes; pressure devices for engaging the belts to grip the containers between them, each device including a series of upper and a series of lower rollers for engaging the inner faces of the belts, means for adjusting one series of rollers of each device relatively to the other series for causing the belts to exert pressure at vertically aligned points; mechanism for driving the belts at the opposite sides of the containers differentially for imparting rotation and lifting movement to the containers; and means for exerting pressure against the caps to seal the containers during their rotation and lifting movement.

6. Apparatus for sealing closure caps on filled containers which comprises: means for continuously conveying filled containers in progression; means for delivering caps for engagement by, and movement with, the moving containers; a pair of endless side-belts for engaging each of the opposite sides of the containers mounted with an upward and forward pitch, for imparting helical movement to the containers on their own vertical axes; pressure devices for engaging the belts to grip the containers between them, each device including a series of upper and a series of lower rollers for engaging the inner faces of the belts; means for varying the pitch of the portion of the belts traversing the pressure devices; mechanism for driving the belts at the opposite sides of the containers differentially, for imparting rotation and lifting movement to the containers; and means for exerting pressure against the caps to seal the containers during their rotation and lifting movement.

7. Apparatus for sealing closure caps on filled containers which comprises: means for continuously conveying filled containers in progression; means for delivering caps for engagement by, and movement with, the moving containers; a pair of endless side-belts for engaging each of the opposite sides of the containers, mounted with an upward and forward pitch, for imparting helical movement to the containers on their own vertical axes; pressure devices for engaging the belts to grip the containers between them, each device including a series of upper and a series of lower rollers for engaging the inner faces of the belts, the rollers being mounted on axes perpendicular to the pitch of the belts, means for adjusting one series of rollers of each device relatively to the other series for causing the belts to exert pressure at vertically aligned points; means for varying the pitch of the portion of the belts traversing the pressure devices; mechanism for driving the belts at the opposite sides of the containers differentially, for imparting rotation and lifting movement to the containers; and means for exerting pressure against the caps to seal the containers during their rotation and lifting movement.

8. Apparatus for sealing closure caps on filled containers which comprises: means for continuously conveying filled containers in progression; means for delivering caps for engagement by, and movement with, the moving containers; a pair of endless side-belts for engaging each of the opposite sides of the containers mounted with an upward and forward pitch, for imparting helical movement to the containers on their own vertical axes; pressure devices for engaging the belts to grip the containers between them, each device including a series of upper and a series of lower rollers for engaging the inner faces of the belts and guide-surfaces for the side faces of the belts; means for varying the pitch of the portion of the belts traversing the pressure devices; mechanism for driving the belts at the opposite sides of the containers differentially, for imparting rotation and lifting movement to the containers; and means for exerting pressure against the caps to seal the containers during their rotation and lifting movement.

9. Apparatus for sealing closure caps on filled containers, comprising: means for delivering caps to the tops of the containers, side-belts engageable with a line of the containers and adapted to impart combined helical-lifting and forward movements to the containers, mechanism for operating said side-belts to successively impart said combined movements to the containers in the line, and means for holding the caps against rotation and sealing the caps on the containers during such combined movements.

10. Apparatus for sealing closure caps on filled containers, comprising: means for delivering caps to the tops of the containers, side-belts engageable with the containers and adapted to impart combined helical-lifting and forward movements to the containers, mechanism for continuously operating said side-belts to successively impart said combined movements to the containers in the line, and means for holding the caps against rotation and sealing the caps on the containers during such combined movements.

11. Apparatus for sealing closure caps on filled containers, comprising: a conveyor for moving the containers forwardly in a line, means for delivering caps to the tops of the containers on the conveyor, side-belts engageable with the sides of the containers on the conveyor and adapted to impart combined helical-lifting and forward movements to the containers, mechanism for operating said side-belts to successively impart such combined movements to the containers in said line and thereby lift them off the conveyor, and means for holding the caps against rotation and sealing the caps on the containers during said combined movements of the containers.

12. Apparatus for sealing closure caps on filled containers, comprising: a conveyor for moving the containers forwardly in a line, means for delivering caps to the tops of the containers on the conveyor, elements engageable with the sides of the containers in a line on the conveyor and operable to impart combined helical-lifting and forward movements to the containers, mechanism for operating said elements to successively impart such combined movements to the containers in said line and thereby lift them off the conveyor, vertical pressure means for holding the caps against rotation and sealing the caps on the containers during said combined movements of the containers, and means for engaging the conveyor with the containers after they have been lifted off the conveyor and the caps have been sealed.

13. Apparatus for sealing closure caps on filled containers, comprising: a conveyor for moving the containers forwardly in a line, means for delivering caps to the tops of the containers on the conveyor, belts engageable with the sides of the containers in a line on the conveyor adapted to impart combined helical-lifting and forward movements to the containers, mechanism for continuously operating said belts to successively impart such combined movements to the containers in said line and thereby lift them off the conveyor, vertical pressure means for holding the caps against rotation and sealing the caps on the containers during said combined movements of the containers, and means for engaging the conveyor with the containers after the containers have been lifted off the conveyor and the caps have been sealed.

14. That improvement in sealing closure caps on filled containers which comprises: moving filled containers forwardly in progression, delivering caps onto the containers for engagement and movement thereby; imparting combined helical-lifting and forward movements to the containers in a line; and subjecting the caps to pressure and holding them against rotation to seal the caps on the containers while the containers are being lifted and are moving forwardly.

15. That improvement in sealing screw caps on filled containers which comprises: moving filled containers forwardly in progression; delivering caps onto the containers for engagement and movement thereby; imparting combined helical-lifting and forward movements to the containers in a line; and subjecting the caps to pressure and holding them against rotation to screw the caps on the containers while the containers are being lifted and moved forwardly.

WINTHROP L. BROWN.

REFERENCES CITED

The following references are of record in the file of this patent:

UNITED STATES PATENTS

| Number | Name | Date |
|---|---|---|
| 652,677 | Kellington et al. | June 26, 1900 |
| 1,172,447 | Forte | Feb. 26, 1916 |
| 1,260,636 | Campbell et al. | Mar. 26, 1918 |
| 1,664,514 | Kramer | Apr. 3, 1928 |
| 1,760,859 | Lach | May 27, 1930 |
| 1,767,818 | Smulski | June 24, 1930 |
| 2,041,891 | White | May 26, 1936 |
| 2,072,245 | Cuthbert et al. | Mar. 2, 1937 |
| 2,319,213 | Davies | May 18, 1943 |
| 2,357,826 | Hohl | Sept. 12, 1944 |
| 2,435,127 | Cameron | Jan. 27, 1948 |